(12) United States Patent
Cis et al.

(10) Patent No.: US 11,108,313 B2
(45) Date of Patent: Aug. 31, 2021

(54) METHOD OF ASSEMBLING A TORQUE MOTOR

(71) Applicant: Hamilton Sundstrand Corporation, Charlotte, NC (US)

(72) Inventors: Marcin Cis, Lutynia (PL); Michał Bieleń, Sycow (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 145 days.

(21) Appl. No.: 16/434,801

(22) Filed: Jun. 7, 2019

(65) Prior Publication Data
US 2020/0036272 A1 Jan. 30, 2020

(30) Foreign Application Priority Data
Jul. 25, 2018 (EP) .................................... 18461595

(51) Int. Cl.
*H02K 26/00* (2006.01)
*H02K 15/00* (2006.01)
*F16K 31/04* (2006.01)

(52) U.S. Cl.
CPC ............. *H02K 26/00* (2013.01); *H02K 15/00* (2013.01); *F16K 31/04* (2013.01)

(58) Field of Classification Search
CPC ......... H02K 26/00; H02K 15/00; F16K 31/04
USPC ........................................................ 310/28
See application file for complete search history.

(56) References Cited

U.S. PATENT DOCUMENTS

| 4,518,937 A | 5/1985 | Parker |
| 4,997,002 A * | 3/1991 | Blatter .................. F15B 13/043 137/625.62 |
| 5,035,254 A * | 7/1991 | Blatter .................. F15B 13/043 137/85 |
| 10,199,912 B2 * | 2/2019 | Tranovich ............... H01F 7/145 |
| 10,811,948 B2 * | 10/2020 | Biele ....................... H02K 26/00 |
| 2006/0090799 A1 | 5/2006 | Achmad et al. |
| 2016/0049230 A1 | 2/2016 | Cichon |
| 2018/0138789 A1 * | 5/2018 | Zak ......................... H02K 1/223 |

OTHER PUBLICATIONS

European Search Report for Application No. 18461595.3, dated Feb. 1, 2019, 7 pages.

\* cited by examiner

*Primary Examiner* — Forrest M Phillips
(74) *Attorney, Agent, or Firm* — Cantor Colburn LLP

(57) ABSTRACT

There is provided a method of assembling a torque motor. The method comprises fastening the torque motor to a support such that any magnetic elements of the torque motor are substantially fixed in position with respect to the support, but without securing an armature to the torque motor, locating the armature of the torque motor around a fixed element of the torque motor such that the armature is able to move with respect to the fixed element, moving the armature with respect to the fixed element whilst the magnetic elements of the torque motor are substantially fixed in position with respect to the support, so as to position the armature in an in use orientation or position, and then attaching the armature to the fixed element in the in use orientation or position.

20 Claims, 4 Drawing Sheets

METHOD OF ASSEMBLING A TORQUE MOTOR

FOREIGN PRIORITY

This application claims priority to European Patent Application No. 18461595.3 filed Jul. 25, 2018, the entire contents of which is incorporated herein by reference.

FIELD

The present disclosure relates generally to a method of assembling a servovalve, and various tools and apparatus associated with the same.

BACKGROUND

Servovalves are commonly used in many aviation and other industrial applications, and are typically provided to precisely control a flow of a working fluid. The flow of such a fluid may be directly related and proportional to an electric current applied to a torque motor of the servovalve. As described in more detail below, within the torque motor electrical energy may be transformed through electromagnetic coils to displace or rotate a movable armature in order to actuate working elements of the valve.

The performance of a servovalve depends on the accurate setup of its components, in particular the magnetic elements thereof. Some of the most important parameters of the magnetic circuit may typically be the size and symmetry of the air gaps between the various magnetic components, for example. This imposes certain requirements on the geometry and tolerances of such components.

FIG. 1 shows a conventional arrangement of a torque motor 10 that has been assembled according to one particular technique.

The torque motor 10 comprises an armature 12 that is configured to pivot about an axis upon activation of electromagnetic coils 14. The pivoting of the armature 12 is configured to cause movement of various components (e.g., a flapper in an armature/flapper assembly or a jet pipe) that extend or are contained at least in part within a base 16 of the torque motor 10. This movement actuates one or more elements of an amplifier or control valve.

The structure of a torque motor 10 is largely known in the art. In addition to the armature 12 and the electromagnets 14, the torque motor 10 typically comprises an upper pole piece 20 and a lower pole piece 22. The torque motor 10 may be held together using one or more fasteners 29 that extend through permanent magnets 30. The height of the permanent magnets 29 may define the distance between the upper pole piece 20 and the lower pole piece 22.

In many designs of torque motor 10, including the one illustrated in FIG. 1, the armature 12 may be mounted on a flexible member 40, for example using a brazing or a welding process. A stiff tube 42 may be provided that surrounds the flexible member 40 in order to provide a certain degree of stability. In addition, a setting shim 44 may be provided in order to assist in aligning the various components as discussed in more detail below.

During the construction process of the torque motor, and after the fastening of the various components together using the fasteners 29, the armature 12 may be poorly aligned, for example with the corresponding services of the pole pieces 20, 22. This poor alignment may be a result of the influences of thermal expansion and other stresses during the construction process. In order to overcome this poor alignment, the armature 12 may be moved by manipulating (e.g., bending) the flexible member 40, or by cutting/machining some of the components after assembly (e.g., using electrical discharge machining). In addition, or alternatively the setting shim 44 may be modified (e.g., machined) in order to modify the height or orientation of the lower pole piece 22. The setting shim 44 supports the various components of the torque motor (including the upper and lower pole pieces 20, 22 and permanent magnets 30) and is configured such that air gaps of equal width are present below and above armature.

It is desired to improve the method of assembling a torque motor, in particular to avoid the need for the above described machining and other solutions for overcoming poor alignment of the armature thereof.

SUMMARY

In accordance with the disclosure there is provided a method of assembling a torque motor, comprising: fastening the torque motor to a support such that any magnetic elements of the torque motor are substantially fixed in position with respect to the support, but without securing an armature to the torque motor; locating the armature of the torque motor around a fixed element of the torque motor such that the armature is able to move with respect to the fixed element; moving the armature with respect to the fixed element whilst the magnetic elements of the torque motor are substantially fixed in position with respect to the support so as to position the armature in an in use orientation or position; and then attaching the armature to the fixed element in the in use orientation or position.

The above method means that the armature can be positioned with respect to the magnetic elements to achieve the desired in use orientation or position (e.g., with the desired spacing between the armature and the magnetic elements) before the armature is attached (e.g., welded or brazed) to the torque motor.

The magnetic elements may comprise one or more pole pieces and/or one or more electromagnetic coils and/or one or more permanent magnets.

The method may further comprise sliding and/or rotating the armature along and/or around the fixed element during the moving step.

The method may further comprise using the fixed element as a guide to position the armature in the in use orientation or position during the moving step.

During the moving step the fixed element may permit movement of the armature relative thereto, whilst substantially restricting movement of the armature in a direction along a longitudinal axis of the armature, once the armature is located around the fixed element. The movement permitted by the fixed element as aforesaid may include rotational movement about one or more axes. The fixed element may comprise a longitudinal axis, and during the locating step the armature may be moved along, or rotated about the longitudinal axis of the fixed element. The armature may comprise a longitudinal axis, and during the locating step the armature may be rotated about the longitudinal axis of the armature. The fixed element may comprise a transverse axis (e.g., perpendicular to its longitudinal axis), and during the locating step the armature may be rotated about the transverse axis of the fixed element.

The method may further comprise, subsequent to the moving step (e.g., immediately after and/or without any further movement) and prior to the attaching step, fixing or holding the armature in its in use orientation or position using one or more spacers. The fixing may comprise positioning one or more of the spacers between the armature and one of the magnetic elements of the torque motor.

The fixing may comprise positioning a first of the spacers between the armature and an upper pole piece of the torque motor, and may further comprise positioning a second of the spacers between the armature and a lower pole piece of the torque motor, such that the first and second spacers restrict movement of the armature with respect to the upper pole piece and the lower pole piece.

The attaching step may comprise welding or brazing the armature to the fixed element in the in use orientation or position. The welding or brazing may comprise one or more of laser welding, electron beam welding or laser brazing.

In accordance with an aspect of the disclosure, there is provided a torque motor, comprising: a support; a plurality of magnetic elements substantially fixed in position with respect to the support; and an armature unsecured to the torque motor. The armature is located around a fixed element of the torque motor such that the armature is able to move with respect to the fixed element, and the armature is movable with respect to the fixed element whilst the magnetic elements of the torque motor are substantially fixed in position with respect to the support, so the armature can be positioned into an in use orientation or position.

BRIEF DESCRIPTION OF THE DRAWINGS

Various embodiments will now be described, by way of example only, and with reference to the accompanying drawings in which:

FIGS. 2A and 2B show different view of an element to which the armature shown in FIG. 2 can be mounted to;

DETAILED DESCRIPTION

Herewith will be described various embodiments of a method of assembling a torque motor for a servovalve, in which the position of an armature of the torque motor may be modified without substantial machining or manipulation of other components (e.g., bending) during the assembly of the torque motor. This is achieved by mating the armature with a stationary element that permits movement of the armature when the other magnetic elements of the armature are fixed in position, such that the armature may be moved and rotated prior to being welded into position to secure it in place. Further details of this method will be discussed below in more detail.

Figure 2:
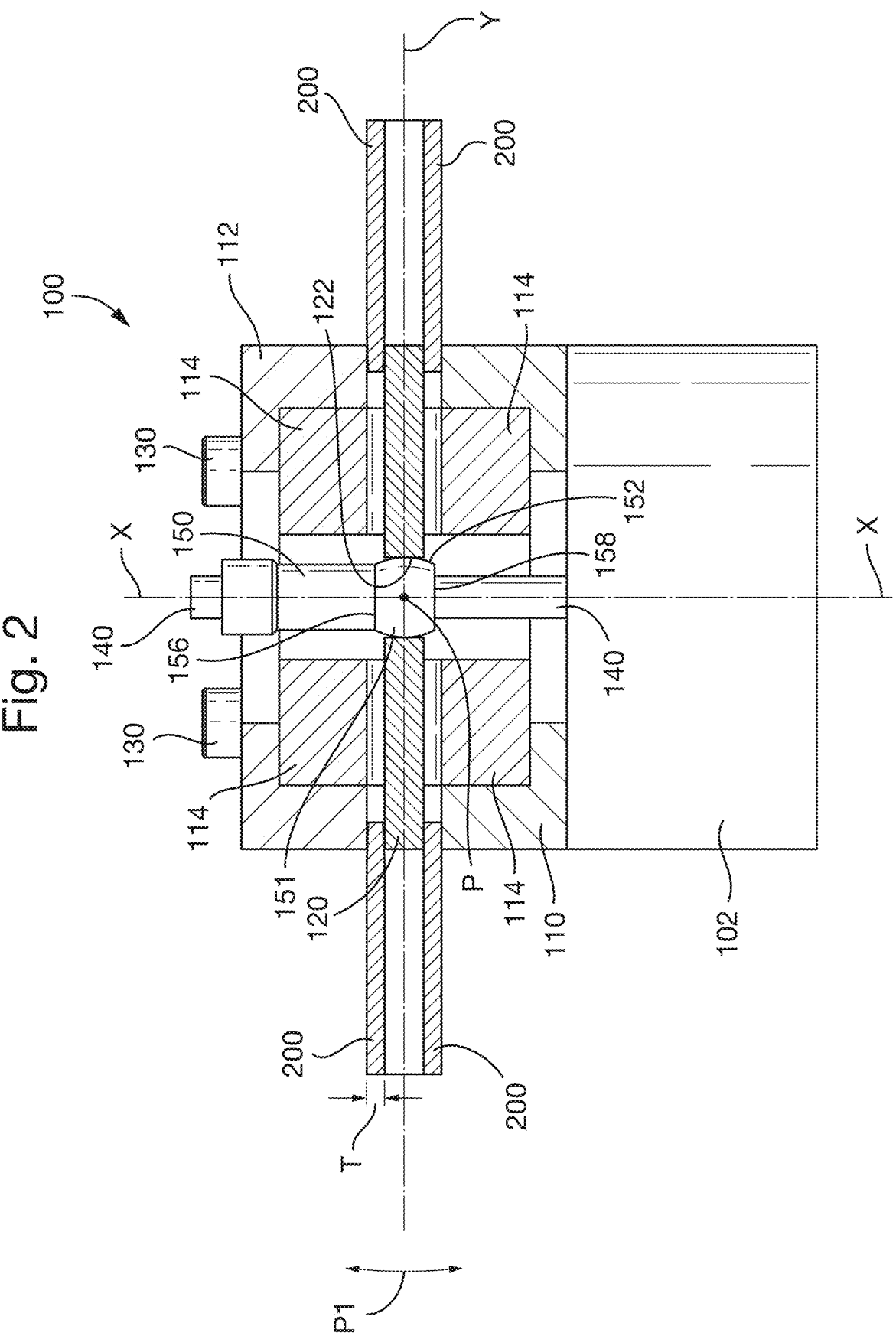
FIG. 2 shows a cross-sectional view of an assembled torque motor prior to an armature of the torque motor being welded in position, to illustrate certain embodiments of the methods described herein.

FIG. 2 shows a cross-sectional view of a torque motor 100 that has been assembled in a typical manner. That is, a support or base 102 is provided and is configured to support various components of the torque motor 100. In various embodiments, the base 102 may also include one or more elements of a system to be controlled by the torque motor 100, for example hydraulic elements.

The system may be an actuator, for example, the torque motor 100 may be part of a servovalve configured to control how hydraulic fluid is sent to the actuator, and the actuator may be an actuator for an aircraft. Various embodiments of the present disclosure are directed to methods of assembling an actuator, e.g., for an aircraft, and comprising the torque motor 100 described herein, and/or comprising methods of assembling the torque motor 100 as described herein.

The torque motor 100 and/or servovalve incorporating it may be used to control powerful hydraulic cylinders (e.g., an aircraft flight control surface) with a very small electrical signal, and can provide precise control of position, velocity, pressure, and force with good post-movement damping characteristics. The uses of a torque motor 100 and/or servovalve are well known in the art, and will not be described in great detail herein. The methods described herein may be used to assemble any type of torque motor known in the art, to the extent that they are compatible.

The torque motor 100 further comprises a lower pole piece 110 that is mounted directly onto the base 102, as well as an upper pole piece 112 that is positioned above the lower pole piece 110 in an opposing relationship. Electromagnetic coils 114 are positioned in between the upper and lower pole pieces 112, 110 and surround an armature 120.

The magnetic elements of the torque motor 100 provide a magnetic field or circuit through the armature 120 that is modified upon application of an electrical current applied to the electromagnetic coils 114. Depending on the electrical signal applied, the magnetic field will be modified and cause a rotation of the armature 120, which rotation can be used to move a component of the servovalve, which may be, for example, a flapper in a nozzle/flapper assembly or a jet pipe.

Figure 1:
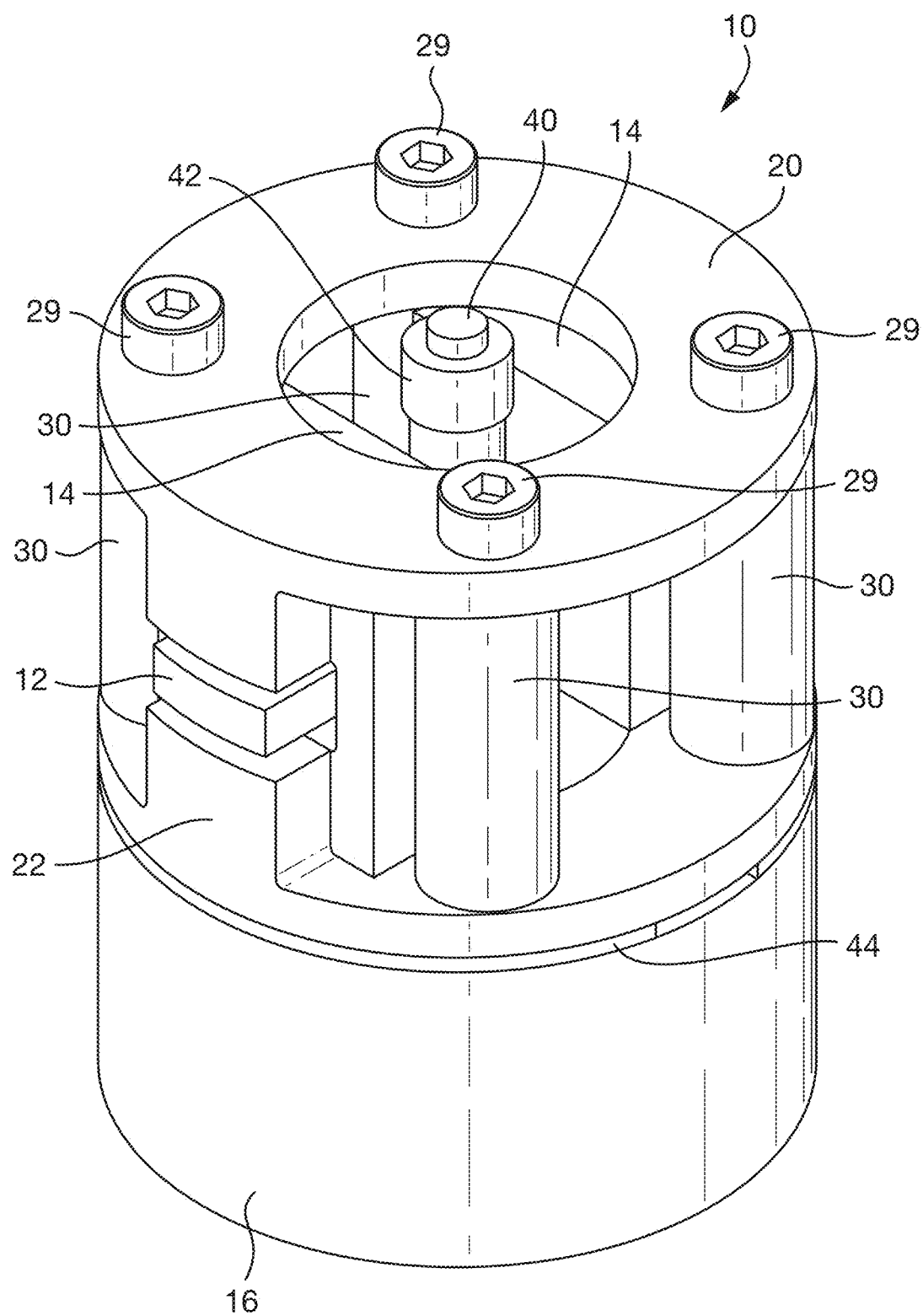
FIG. 1 shows an arrangement of a conventional torque motor when fully assembled, for illustrative purposes only.

The torque motor 100 comprises a plurality of fasteners 130 configured to extend through the torque motor 100 and secure the components of the torque motor 100 to the base 102. As with the embodiment of FIG. 1, permanent magnets (not shown) may extend around the fasteners 130. The height of the permanent magnets may define the distance between the upper pole piece 112 and the lower pole piece 110.

Figure 2A:
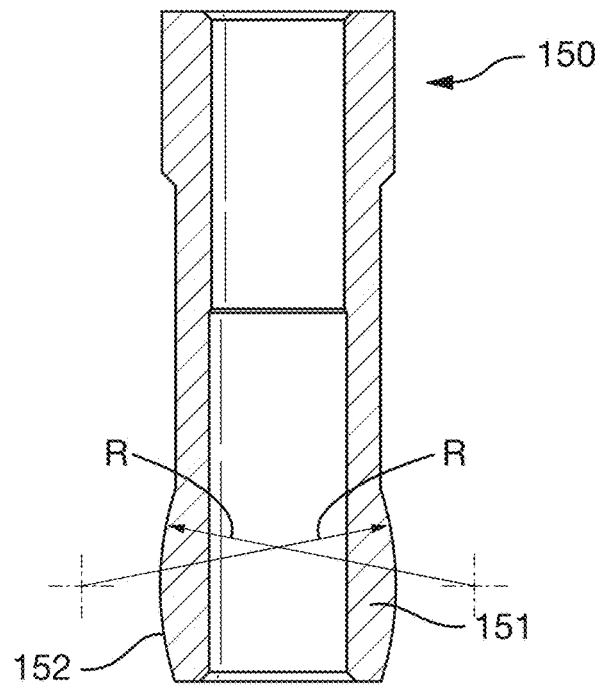
Figure 2B:
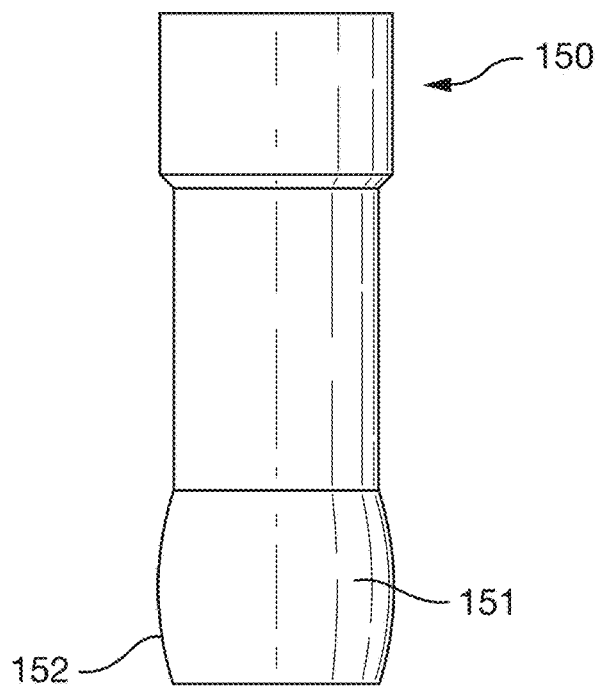

The armature 120 is mounted to an element 150 (see FIGS. 2A and 2B) that may be generally cylindrical and may further comprise a spherical portion 151 at one end thereof. The spherical portion 151 may be in the form of a spherical segment, which is a solid formed by cutting a sphere with a pair of parallel planes. The spherical portion 151 may be in the form of a symmetrical spherical segment, which is defined as a solid formed by cutting a sphere with a pair of parallel planes on opposed sides of an orthodrome (a plane passing through a centre point) of the sphere. In other embodiments the portion 151 of the element may be cylindrical, rather than spherical, although this would reduce the number of degrees of freedom of movement of the armature 150 when it is mounted thereto, as discussed in more detail below.

The element 150 may itself be positioned or mounted around a flexible member 140, which may extend along the axis X and is in the form of a long tubular member, which is fixed to the base 102 at one end and to the element 150 at the opposed end. The flexible member 140 and/or rigid tube 142 may be mounted to a housing (not shown) of the servovalve, and may be configured to hold the armature 120 partly in position once the torque motor 100 is assembled.

The armature 120 comprises an aperture through which the element 150 extends, wherein the aperture comprises an inner circumferential surface 122 (e.g., with respect to the axis X, which may also be the longitudinal axis of the aperture) configured to mate with the outer surface 152 of the element 150. This configuration may be a spherical or cylindrical joint, e.g., a ball and socket type joint, wherein the armature 120 is able to move freely around the element 150, but cannot detach from the element 150 during such movement.

The shape (e.g., contour or profile) of the inner circumferential surface 122 of the armature 120 may be configured to match that of the of opposing outer surface 152 of the element 150, to minimise the tolerance between these two components. However, the inner circumferential surface 122 could have any suitable shape (e.g., cylindrical) and still operate in the manner described herein.

The element 150 may have a spherical profile over the outer surface 152, which may extend from a first end 156 of the spherical portion 151 to a second end 158 of the spherical portion 151 in a direction along the axis X.

Mating the armature 120 to the element 150 using a spherical or cylindrical joint means that the armature 120 can be manipulated (e.g., moved, rotated, translated, etc.) prior to being welded in position. This means that after assembly of the other components of the torque motor 100, for example the upper and lower pole pieces 112, 110 and the electromagnetic coils 114, the armature 120 can be moved into its optimum position without substantial stresses being applied to the armature 120 or flexible member 140 and/or rigid tube 142. This can also avoid the need for a setting shim (see element 44 in FIG. 1), since the purpose of this component is to modify the position of the armature 120 in the torque motor 100.

In order to position the armature 120 in its optimum position, one or more spacers 200 may be provided. The spacers 200 that are used may be selected from a plurality of spacers, each having a different thickness T. The spacers 200 may be pins, or alternatively may be rectangular members configured to fit between the armature 120 and the upper pole piece 112 or the lower pole piece 110 as shown in FIG. 2, to hold the armature 120 in position prior to being welded.

As will be appreciated, other than the armature 120 the components of the torque motor 100 will remain substantially stationary (e.g., fixed in position using the fasteners 130) throughout the positioning of the armature 120 into its optimum position, optionally using the spacers 200.

In embodiments where the element 150 is cylindrical, the armature 120 may be moved along, and rotated around the axis X. In embodiments where the element 150 is in the shape of a spherical segment, the armature 120 may be moved along, and rotated around the axis X, and in addition may be rotated about its longitudinal axis Y (see also FIG. 4), and further may be rotated about the pivot P as indicated by arrow P', e.g., rotated about the axis Z shown in FIG. 4.

In this manner, the element 150 may be referred to as a fixed element 150 configured as a guide for the armature 120, wherein the armature 120 is able to slide and/or rotate along and/or around the fixed element 150 so as to locate the armature 120 in its optimum position.

The optimum position of an armature within a torque motor may vary between each torque motor, and may be affected by the manufacturing tolerances within each torque motor as they are assembled. As such, and as discussed above adjustment of the position of the armature may be necessary even using very precise manufacturing methods. The most typical adjustments required are the air gaps between the armature and the magnetic elements of the torque motor, as well as small geometrical orientations of the armature itself. The methods described herein permit successful adjustments of the armature without affecting the remaining components of the torque motor. This is in contrast to the conventional methods described above in respect of FIG. 1, which may require bending or manipulation of the flexible element, or inclusion (and/or machining) of a setting shim between the base of the torque motor and the lower pole piece.

The optimum position of the armature 120 may correspond to an in use position or orientation, such that the torque motor 100 may be operational and/or ready for insertion into a servovalve once the armature 120 is in its in use position or orientation.

Figure 3:
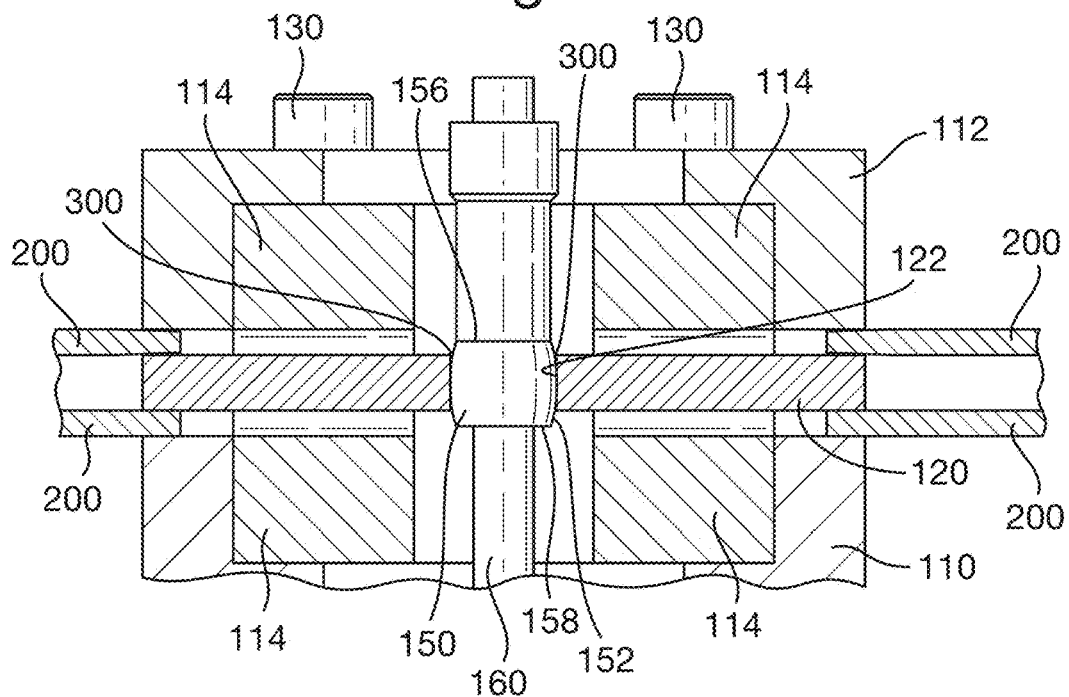
FIG. 3 shows a magnified view of the embodiment shown in FIG. 2 to illustrate possible welding areas during the methods described herein.
Figure 4:
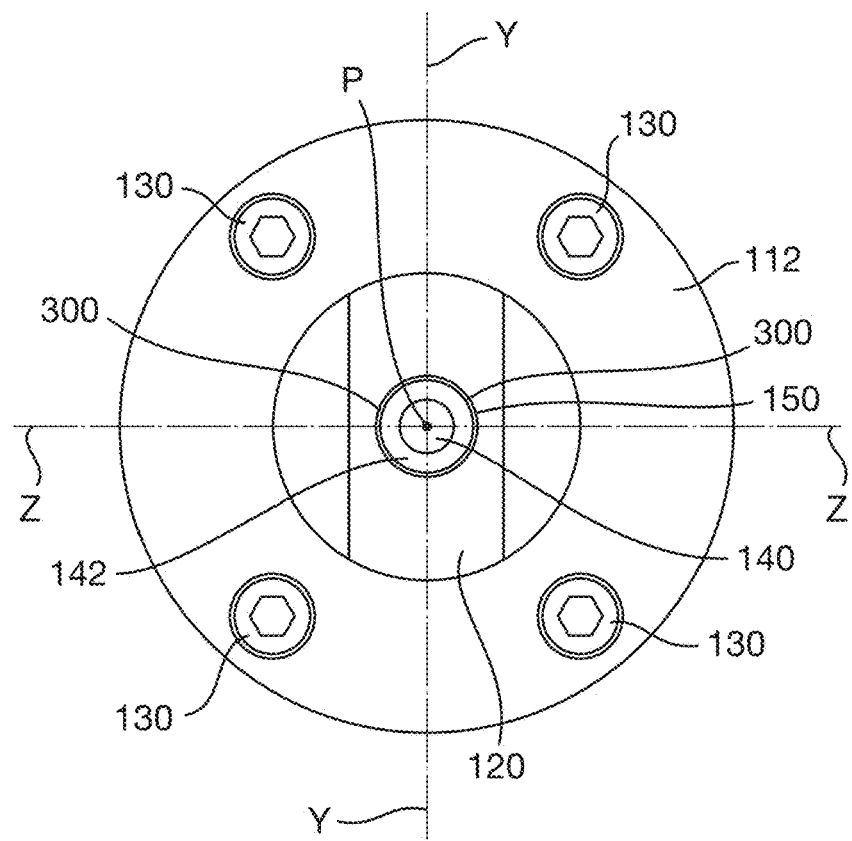
FIG. 4 shows a top view of the embodiment shown in FIG. 2 to illustrate the welding areas shown in FIG. 3 from another angle.

Once the armature 120 is located in its optimum position, it may be attached to the element 150, for example by welding or brazing. The processed used may be, for example, laser welding, electron beam welding or laser brazing. These processes may be particularly suitable due to the limited access to the armature 120 once the torque motor 100 is assembled as shown in FIGS. 2-4. The armature 120 may be secured in a position 300 where a top edge of the inner circumferential surface 122 of the armature 120 meets the outer surface 152 of the element 150. This is shown in FIGS. 3 and 4.

Once the armature 120 is welded the torque motor 100 may be ready for operation within a servovalve. Further technical effects achieved using the methods described herein are a reduced risk of damage due to a reduced requirement of manipulating or machining other components of the torque motor. Given that such machining or manipulation imposes stresses on the components that are present throughout the life of the torque motor, the methods described herein also increase the lifetime of the torque motor within a servovalve. The reduction of machining also leads to reduced foreign objects within the torque motor, such as offcuts from the machining. In addition, fewer components are required and the requirements on the assembly system are also reduced. The use of special tools (e.g., setting shim(s) and a machining system associated therewith) is reduced as well.

Aspects of the present disclosure relate to a torque motor in a partly assembled state, i.e., prior to the attachment of the armature thereto. In one embodiment, a torque motor is provided (e.g., the torque motor 100 shown in FIGS. 2-4), the torque motor comprising a support, a plurality of magnetic elements (e.g., upper and/or lower pole pieces 110, 112 and/or electromagnetic coils 114 described above) substantially fixed in position with respect to the support, and an armature unsecured to the torque motor (e.g., as shown in FIG. 2). The armature 120 is located around a fixed element (e.g., element 150 described above) of the torque motor such that the armature is able to move with respect to the fixed element. In addition, the armature is movable with respect to the fixed element whilst the magnetic elements of the torque motor are substantially fixed in position with respect to the support. In this manner, the armature can be positioned into an in use orientation or position as described in the method above.

Although the present disclosure has been described with reference to various embodiments, it will be understood by those skilled in the art that various changes in form and detail may be made without departing from the scope of the invention as set forth in the accompanying claims.

The invention claimed is:

1. A method of assembling a torque motor, comprising:
   fastening the torque motor to a support such that any magnetic elements of the torque motor are substantially fixed in position with respect to the support, but without securing an armature to the torque motor;

locating the armature of the torque motor around a fixed element of the torque motor such that the armature is able to move with respect to the fixed element;

moving the armature with respect to the fixed element whilst the magnetic elements of the torque motor are substantially fixed in position with respect to the support, so as to position the armature in an in use orientation or position;

after moving the armature, attaching the armature to the fixed element in the in use orientation or position;

wherein during the moving step the fixed element permits movement of the armature relative thereto, whilst substantially restricting movement of the armature in a direction along its longitudinal axis (Y), once the armature is located around the fixed element;

wherein the movement permitted as aforesaid includes rotational movement about one or more axes (X,Y,Z).

2. The method as claimed in claim 1, wherein the magnetic elements comprise one or more pole pieces and/or one or more electromagnetic coils and/or one or more permanent magnets.

3. The method as claimed in claim 2, further comprising sliding and/or rotating the armature along and/or around the fixed element during the moving step.

4. The method as claimed in claim 3, further comprising using the fixed element as a guide to position the armature in the in use orientation or position during the moving step.

5. The method as claimed in claim 1, wherein the fixed element comprises a longitudinal axis (X), and during the locating step the armature is moved along, or rotated about the longitudinal axis (X) of the fixed element.

6. The method as claimed in claim 1, further comprising, subsequent to the moving step and prior to the attaching step, fixing the armature in its in use orientation or position using one or more spacers.

7. The method as claimed in claim 6, wherein the fixing comprises positioning one or more of the spacers between the armature and one of the magnetic elements of the torque motor.

8. The method as claimed in claim 6, wherein the fixing comprises positioning a first of the spacers between the armature and an upper pole piece of the torque motor, and positioning a second of the spacers between the armature and a lower pole piece of the torque motor, such that the first and second spacers restrict movement of the armature with respect to the upper pole piece and the lower pole piece.

9. The method as claimed in claim 1, wherein the attaching step comprises welding or brazing the armature to the fixed element in the in use orientation or position.

10. The method as claimed in claim 9, wherein the welding or brazing comprising one or more of laser welding, electron beam welding or laser brazing.

11. A method of assembling a torque motor, comprising:
fastening the torque motor to a support such that any magnetic elements of the torque motor are substantially fixed in position with respect to the support, but without securing an armature to the torque motor;

locating the armature of the torque motor around a fixed element of the torque motor such that the armature is able to move with respect to the fixed element;

moving the armature with respect to the fixed element whilst the magnetic elements of the torque motor are substantially fixed in position with respect to the support, so as to position the armature in an in use orientation or position; and after moving the armature, attaching the armature to the fixed element in the in use orientation or position;

wherein the armature comprises a longitudinal axis (Y), and during the locating step the armature is rotated about the longitudinal axis (Y) of the armature; or wherein the fixed element comprises a transverse axis (Z), and during the locating step the armature is rotated about the transverse axis (Z) of the fixed element.

12. The method as claimed in claim 11, wherein the magnetic elements comprise one or more pole pieces and/or one or more electromagnetic coils and/or one or more permanent magnets.

13. The method as claimed in claim 12, further comprising sliding and/or rotating the armature along and/or around the fixed element during the moving step.

14. The method as claimed in claim 13, further comprising using the fixed element as a guide to position the armature in the in use orientation or position during the moving step.

15. The method as claimed in claim 11, wherein the fixed element comprises a longitudinal axis (X), and during the locating step the armature is moved along, or rotated about the longitudinal axis (X) of the fixed element.

16. The method as claimed in claim 11, further comprising, subsequent to the moving step and prior to the attaching step, fixing the armature in its in use orientation or position using one or more spacers.

17. The method as claimed in claim 16, wherein the fixing comprises positioning one or more of the spacers between the armature and one of the magnetic elements of the torque motor.

18. The method as claimed in claim 17, wherein the fixing comprises positioning a first of the spacers between the armature and an upper pole piece of the torque motor, and positioning a second of the spacers between the armature and a lower pole piece of the torque motor, such that the first and second spacers restrict movement of the armature with respect to the upper pole piece and the lower pole piece.

19. The method as claimed in claim 11, wherein the attaching step comprises welding or brazing the armature to the fixed element in the in use orientation or position.

20. A method as claimed in claim 19, wherein the welding or brazing comprising one or more of laser welding, electron beam welding or laser brazing.

* * * * *